United States Patent
Panamarathupalayam et al.

(10) Patent No.: US 11,339,318 B2
(45) Date of Patent: May 24, 2022

(54) THERMAL STABILITY OF HIGH TEMPERATURE OIL BASED SYSTEM ENHANCED BY ORGANOPHILIC CLAY

(71) Applicant: Schlumberger Technology Corporation, Sugar Land, TX (US)

(72) Inventors: Balakrishnan Panamarathupalayam, Houston, TX (US); Paulo Pauferro, Jr., Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/176,930

(22) Filed: Feb. 16, 2021

(65) Prior Publication Data

US 2021/0163808 A1   Jun. 3, 2021

Related U.S. Application Data

(62) Division of application No. 16/074,060, filed as application No. PCT/US2017/015597 on Jan. 30, 2017, now Pat. No. 10,920,124.

(60) Provisional application No. 62/288,861, filed on Jan. 29, 2016.

(51) Int. Cl.
  *C09K 8/36* (2006.01)
(52) U.S. Cl.
  CPC ..................... *C09K 8/36* (2013.01)
(58) Field of Classification Search
  None
  See application file for complete search history.

(56) References Cited

U.S. PATENT DOCUMENTS

| | | | |
|---|---|---|---|
| 5,718,841 A * | 2/1998 | Mardis | A61K 8/416 516/34 |
| 6,187,719 B1 * | 2/2001 | Dino | C01B 33/44 507/129 |
| 6,861,394 B2 | 3/2005 | Ballard et al. | |
| 2003/0114316 A1 | 6/2003 | Patel et al. | |
| 2005/0003967 A1 | 1/2005 | Rea | |
| 2005/0239662 A1 | 10/2005 | Patel | |
| 2007/0197403 A1 | 8/2007 | Dino | |
| 2008/0194433 A1 | 8/2008 | Tehrani | |
| 2013/0020081 A1 * | 1/2013 | Maghrabi | C09K 8/00 166/279 |
| 2013/0020083 A1 * | 1/2013 | Wagle | C09K 8/12 166/285 |
| 2013/0105164 A1 | 5/2013 | Istre et al. | |
| 2014/0148369 A1 | 5/2014 | Tang et al. | |
| 2014/0309146 A1 * | 10/2014 | D'Elia | C09K 8/36 507/129 |
| 2016/0186034 A1 | 6/2016 | Mainye et al. | |
| 2019/0040296 A1 | 2/2019 | Panamarathupalayam et al. | |

FOREIGN PATENT DOCUMENTS

WO   2015138407 A1   9/2015

OTHER PUBLICATIONS

Ezzat et al, Solids-Free Brine-in-Oil Emulsions for Well Completion, SPE 17161; SPE Drilling Engineering, Dec. 1989, pp. 300-306.
GARAMITE® Application Bulletin, "The Use of GARAMITE® Additives as Suspending Agents for Drilling Fluids," BYK Additives, Inc., Gonzales, TX. Provided by Inventor to Attorney for applicant on Oct. 14, 2015.
International Search Report and Written Opinion issued in International Patent application PCT/US2017/015597 dated May 8, 2017, 23 pages.
International Preliminary Report on Patentability issued in International Patent application PCT/US2017/015597, dated Aug. 9, 2018, 10 pages.

* cited by examiner

*Primary Examiner* — John J Figueroa
(74) *Attorney, Agent, or Firm* — Garry Brown, Jr.

(57) ABSTRACT

Compositions herein may include an oleaginous continuous phase, an aqueous discontinuous phase, a first clay comprising an organophilic smectite clay, and a second clay comprising a magnesium silicate clay. Methods herein may include circulating such fluids downhole as well as admixing a magnesium silicate dispersed clay and an organophilic smectite clay in an oleaginous base fluid.

10 Claims, No Drawings

THERMAL STABILITY OF HIGH TEMPERATURE OIL BASED SYSTEM ENHANCED BY ORGANOPHILIC CLAY

CROSS-REFERENCE TO RELATED APPLICATIONS

This application is a divisional application of U.S. patent application Ser. No. 16/074,060, filed Jul. 30, 2018 with the same title which claims priority to PCT application PCT/US2017/015597 filed Jan. 30, 2017 with the same titles which claims priority to U.S. Patent Application Ser. No. 62/288,861, filed Jan. 29, 2016. All three applications are incorporated by reference in their entireties herein.

BACKGROUND

During the drilling of a wellbore, various fluids are typically used in the well for a variety of functions. The fluids may be circulated through a drill pipe and drill bit into the wellbore, and then may subsequently flow upward through wellbore to the surface. During this circulation, the wellbore fluid may act to remove drill cuttings from the bottom of the hole to the surface, to suspend cuttings and weighting material when circulation is interrupted, to control subsurface pressures, to maintain the integrity of the wellbore until the well section is cased, cemented, or completed, to isolate the fluids from the subterranean formation by providing sufficient hydrostatic pressure to prevent the ingress of formation fluids into the wellbore, to cool and lubricate the drill string and bit, and/or to maximize penetration rate.

Upon completion of drilling, a filter cake may develop on the surfaces of a wellbore from the accumulation of additives from a wellbore fluid. This filter cake may stabilize the wellbore during subsequent completion operations such as placement of a gravel pack in the wellbore. Additionally, during completion operations, when fluid loss is suspected, a fluid loss control pill (FLCP) may be spotted into the wellbore to reduce or prevent such fluid loss by injection of other completion fluids behind the FLCP to a position within the wellbore which is immediately above a portion of the formation where fluid loss is suspected. Injection of fluids into the wellbore is then stopped, and fluid loss will then move the pill toward the fluid loss location. Generally, a solids-free FLCP (i.e., with no bridging agents) may be used to minimize fluid losses while a solids-laden FLCP, for example, may be used in wells experiencing high fluid loss. In some embodiments, an invert emulsion comprising an organophilic clay and a high internal phase emulsifier can be used as FLCP's as well as in applications of completion equipment/tolls installation downhole.

After completion operations have been accomplished, removal of filter cake (formed during drilling and/or completion) remaining on the sidewalls of the wellbore may be necessary. Although filter cake formation and use of FLCP's are often used in wellbore, drilling, or completion operations, these barriers can present an impediment to the production of hydrocarbon or other fluids from the well, or to the injection of water and/or gas, if, for example, the rock formation is still plugged by the barrier. Because filter cake is compact, it often adheres strongly to the formation and may not be readily or completely flushed out of the formation by fluid action alone.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more aspects, embodiments disclosed herein relate to a composition that includes an oleaginous continuous phase; an aqueous discontinuous phase; a first clay comprising an organophilic smectite clay; and a second clay comprising a magnesium silicate clay.

In another aspect, embodiments disclosed herein relate to a method that includes circulating an invert emulsion fluid into a wellbore through a formation, the invert emulsion fluid comprising: an oleaginous continuous phase; an aqueous discontinuous phase; a first clay comprising an organophilic smectite clay; and a second clay comprising a magnesium silicate clay.

In yet another aspect, embodiments disclosed herein relate to a method that includes admixing a magnesium silicate dispersed clay and an organophilic smectite clay in an oleaginous base fluid; shearing the dispersed clay and the organophilic clay in the oleaginous base fluid; adding an emulsifier and a halide brine to the oleaginous base fluid to form an invert emulsion fluid; and shearing the invert emulsion fluid.

Other aspects and advantages of the claimed subject matter will be apparent from the following description and the appended claims.

DETAILED DESCRIPTION

Embodiments of the present disclosure may be directed to an oil-based wellbore fluid having improved thermal static stability and rheological properties, including low end rheology, plastic viscosity, and yield point. Further, such stability may be achieved with a broader compatibility for brine chemistries and without necessitating high shear or temperatures to yield.

One or more embodiments may involve circulating an invert emulsion fluid into a wellbore to form a filtercake on the walls thereof. The fluid may be circulated during drilling operations or may be spotted into a wellbore (as a FLCP) to form a filtercake to inhibit fluid entry from the well into the formation, such as during completion operations. As used herein, a FLCP may be used to form a filtercake. In embodiments, the completion operation can include cleanout, gravel packing, or the like, or a combination thereof. In one or more embodiments, the filtercake can plug a screen or perforation tunnel, e.g., in a cased-hole completion, until cleanout.

In an embodiment, such as in the case of high fluid loss, the FLCP may be solids-laden and comprise particles having a mean diameter greater than 5 microns. In an embodiment, the FLCP comprises particles having a plurality of size gradings. Alternatively, or additionally, the FLCP can comprise particles having a plurality of shape types selected from beads, powders, spheres, ribbons, platelets, fibers, flakes, and so on, and combinations thereof. In other embodiments, a solids-free FLCP may have applications in screen running fluids, suspension fluids, and the like.

FLCPs may be used in some embodiments to control leak-off of completion brine after perforating and before gravel packing or frac-packing. They are also used in an additional or alternate embodiment to isolate the completion and wellbore fluid after gravel packing by spotting the pill inside the screen.

In some aspects, the FLCP may comprise a brine internal phase (e.g., discontinuous phase) having a density of at least 1.02 kg/L (8.5 ppg (8.5 pounds per gallon)), but may be as low as 1 kg/L (8.3 ppg). A heavy brine (having a density of at least 1.5 kg/L (12.5 ppg), sometimes also called a high density brine or high brine, may also be used as an internal phase. Available water, other than brine, may also be used in some embodiments as the internal phase for the FLCP.

When used, the brine is water comprising an inorganic salt or organic salt. Embodiments of inorganic monovalent salts include alkali metal halides, such as sodium, potassium or cesium bromide. Embodiments of inorganic divalent salts include calcium halides, for example, calcium chloride or calcium bromide. Zinc halides, such as zinc bromide, may also be used. Inorganic salt can be added to the carrier fluid in any hydration state (e.g., anhydrous, monohydrated, dihydrated, etc.). The carrier brine phase may also comprise an organic salt, in embodiments sodium, potassium, or cesium formate, acetate or the like, which may be added to the treatment fluid up to a concentration at which phase separation might occur, approximately 1.14 kg/L (9.5 ppg). In an embodiment, mixture of organic and inorganic salts can achieve a density higher than about 1.2 kg/L (10 ppg). The salt in one embodiment of the FLCP may be compatible with the wellbore fluid, or in a completion/clean up fluid, e.g., the salt in the FLCP can be the same as the salt used in wellbore fluids.

Organophilic Clays

The present fluids may comprise at least one type of organophilic clay that assist in providing the rheological properties to the fluid, particularly suspension properties at low shear. Examples of organophilic clays include, but are not limited to, a hectorite clay, magnesium silicate clay, organophilic sepiolite clay, and the like.

In one or more embodiments, at least one organophilic clay may be a mineral clay mixture and more particularly an organophilic mineral clay mixture. In one or more embodiments, the mineral clay mixture may be treated with alkyl quaternary ammonium compounds in order to render the mineral clay mixture hydrophobic; such clays may also be termed organophilic. In one or more embodiments, the mineral clay mixtures comprise: a mineral clay (a) comprising 50 to 95 wt. %, based on the weight of the mineral clay mixture, or 60 to 95 wt. %, or 70 to 90 wt. % of a mineral clay selected from the group including sepiolite, palygorskite and mixtures of sepiolite and palygorskite (or other magnesium silicate-based clays alone or in combination with sepiolite and/or palygorskite); and a mineral clay (b) comprising the balance by weight of the mineral clay mixture, of a smectite. In one or more embodiments, the smectite may be a natural or synthetic clay mineral selected from the group including hectorite, montmorillonite, bentonite, beidelite, saponite, stevensite and mixtures thereof. The Garamite line of products available from BYK Additives, (Gonzalez, Tex.) are representative examples of mixed mineral clay products. Garamite®, a wet-processed organoclay, may comprise components such as an organophilic sepiolite and a quaternary amine surfactant, and may act as a suspending agent for wellbore fluids. Due to its unique rheological profile, such magnesium silicate-based suspending agent may increase the low shear viscosity (i.e., suspension) of oil-based wellbore fluids while having minimal impact on high shear viscosity as compared to a traditional organically modified clay which may be used primarily as a viscosifier. The magnesium silicate-based suspending agent may provide low shear viscosity, aka suspension, in wellbore fluids where a traditional organically modified clay is used as a primary viscosifier. In one or more embodiments, the clay minerals may be wet-processed, such as by first dispersing and/or allowing to swell in the presence of water to remove all impurities, to yield complete minerals with homogenous surface to allow exchange with surfactant(s). There may be minimal stacking or rebundling of such processed clay minerals within the clay mixture used herein, which may include a mix of hydrophobic rods or plate minerals, and thus, allows for easy dispersion. Further, magnesium silicate clays, such as Garamite®, are relatively easily disperable clays and may not require any or significant high shear or high temperature to yield.

Both sepiolite and palygorskite are included in the broad grouping of phyllosilicates, or sheet silicates, because they contain a continuous two-dimensional tetrahedral sheet of composition $T_2O_5$ (T=Si, Al, Be, . . . ) but they differ from other layer silicates in lacking continuous octahedral sheets. Thus, they may have properties that differ from other layer silicates and the mineral clay mixture described above may also have differing properties as a result of their presence in the admixture. For example, when compared on a mass basis, the same mass of the mineral clay mixture may have a larger bulk volume than conventional suspending agents that use only smectite type layer silicates. As a result of the increased bulk volume, when using the mineral clay mixture it may be possible to use less suspending agent than is conventionally used to achieve the fluid properties to suspend hydratable polymer therein. The use of less suspending agent may also facilitate easier mixing of the mineral clay mixture into the carrier fluid.

In one or more embodiments, the alkyl quaternary ammonium salts employed for treating the mineral clay mixtures comprise alkyl quaternary ammonium salts containing the same or different straight and/or branched-chain saturated and/or unsaturated alkyl groups of 1 to 22 carbon atoms and the salt moiety is selected from the group including chloride, bromide, methylsulfate, nitrate, hydroxide, acetate, phosphate and mixtures thereof. In one or more embodiments, the alkyl quaternary ammonium salts are dimethyl di(hydrogenated tallow) ammonium chloride, methylbenzyl di(hydrogenated tallow) ammonium chloride, dimethylbenzyl hydrogenated tallow ammonium chloride, dimethyl hydrogenated tallow-2 ethylhexylammonium methylsulfate and mixtures of two or more of the above. It is also envisioned that other fatty acid based quaternary ammonium salts may be used.

As mentioned, the mineral clay mixtures may include, in addition to the magnesium silicate based clay another organophilic clay that is a smectite. In one or more particular embodiments, the additional organophilic clay used herein may be a hectorite clay. An example of a hectorite clay may be VERSAGEL HT™ available from MI-SWACO (Houston, Tex.). Such clay may be a viscosifier used to increase carrying capacity and suspension properties, provide support for weighting materials, improve cuttings removal in wellbore fluids, and aid in filtercake formation and filtration control. Further, while the above description describes a mixture that includes sepiolite, palygorskite, other magnesium silicate clays, or mixtures thereof in an amount that is at least 50% by weight of the clay mixture (with the balance being a smectite), it is also understood that in one or more embodiments, such clay mixture may be combined with an additional quantity of a smectite clay, such that in the wellbore fluid formulation, the smectite is present at a ratio that is greater than 1:1 (smectite: magnesium silicate). In such instance, the organophilic surface modification present on the smectite clay may be the same or different from the organophilic surface modification present on the magnesium silicate. It is also envisioned that within the wellbore fluid formulation, there may be smectites having two distinct organophilic surface modifications thereon. When the entire wellbore fluid formulation is considered, the sepiolite, palygorskite, other magnesium silicate clays, or mixtures thereof may be present, relative to the total amount of organophilic clay in an amount that ranges from a lower limit of any of 20, 25, 30, 35, 40, 45 or 50 percent by weight and an upper limit of any of 35, 40, 45, 50, 60, 70, 80 or 90 percent by weight, where any lower limit can be used in combination with any upper limit. In particular embodiments, the sepiolite, palygorskite, other magnesium silicate clays, or mixtures thereof may be present, relative to the total amount of organophilic clay in a wellbore fluid formulation in an amount that ranges from 30 to 45 percent by weight.

As seen below, magnesium silicate clay and hectorite clay, such as in combination, may enhance the thermal stability of invert emulsions, such as FLCPs, which comprise high internal phase emulsifiers in zinc-based brines. Without such organophilic clays, typical high internal phase emulsifiers may provide limited stability for invert emulsions in zinc bromide brines, such as for 2 days at 375° F. As shown below, addition of organophilic clays, such as hectorite clay, magnesium silicate clay, organophilic sepiolite clay, or a combination thereof, may provide enhanced stability of such invert emulsion fluids for at least 5 days at 375° F. Further, addition of the previously mentioned organophilic clays may increase the low end rheology and reduce plastic viscosity and yield point of the invert emulsions.

Emulsifier

One of the components of wellbore fluids of the present disclosure is an emulsifier that enhances the functional capability of the entire fluid system, such as, the stability or oil wetting in high temperature high pressure (HTHP) conditions. Furthermore, the combination of such emulsifiers with organophilic clays results in improved thermal stability and rheological properties of the fluid. The role of the thermally stable fluid is to maintain viscosity and fluid loss properties in the wellbore fluid, as it becomes exposed to increased temperatures encountered during drilling and production of oil and gas from subterranean formations.

Such emulsifiers may comprise paraffins, fatty-acids, amine-based components, amidoamines, polyolefin amides, soaps of fatty acids, polyamides, polyamines, polyolefin amides, polyolefin amide alkeneamines, alkoxylated ether acids (such as an alkoxylated fatty alcohol terminated with a carboxylic acid), oleate esters, such as sorbitan monoleate, sorbitan dioleate, imidazoline derivatives or alcohol derivatives and combinations or derivatives of the above or the like. Blends of these materials as well as other emulsifiers can be used for this application. Examples of such emulsifiers, such as a high internal phase emulsifier, may be SUREMUL PLUS™ available from MI-SWACO (Houston, Tex.). In particular embodiments, the organophilic clays mixtures of the present disclosure may be used in an invert emulsion fluid stabilized by an emulsifier formed from a fatty acid (one or more of a C10-C24 fatty acid, for example, which may include linear and/or branched, and saturated and/or unsaturated fatty acids) reacted with one or more ethyleneamines (e.g., ethylenediamine, diethylenetriamine, triethylenetetraamine, tetraethylenepentaamine) to produce one or more of amides, polyamides, and/or amidoamines, depending, for example, on the mole ratio of the polyamine to the fatty acid. In one or more embodiments, the emulsifier may be a dimer poly-carboxylic C12 to C22 fatty acid, trimer poly-carboxylic C12 to C22 fatty acid, tetramer poly-carboxylic C12 to C22 fatty acid, mixtures of these acids, or a polyamide wherein the polyamide is the condensation reaction product of a C12-C22 fatty acid and a polyamine selected from the group consisting of diethylenetriamine, triethylenetetramine; and tetraethylenepentamine.

In one or more embodiments, the organophilic clays mixtures of the present disclosure may be used in an invert emulsion fluid stabilized by an emulsifier formed from a polyolefin (such as having a terminal vinyl group, such as polyisobutylene), a carboxylic acid (particularly a di- or poly-carboxylic acid or anhydride thereof), and an alkeneamine (including ethylenediamine, diethylenetriamine, triethylenetetraamine, tetraethylenepentaamine, as well as propyleneamine variants thereof). It is also understood that the polyolefin may be first functionalized with the acid (such as to form polyisobutylene succinic anhydride) prior to reaction with the alkeneamine to form an amide.

In one embodiment, the wellbore fluids of the disclosure may further contain other additives and chemicals that are known to be commonly used in oilfield applications by those skilled in the art. A variety of additives can be included in the oil based wellbore fluid of this disclosure for the formation of a thin, low permeability filter cake which seals pores and other openings in the formations which are penetrated by the bit. Such additives may include thinners, weighting material, wetting agents, surfactants, shale inhibitors, pH buffers, etc.

Wellbore fluids of the present disclosure may contain other materials to comprise complete wellbore fluids. Such other materials optionally may include, for example: additives to reduce or control low temperature rheology or to provide thinning, additives for enhancing viscosity, additives for high temperature high pressure control and emulsion stability. As typically with wellbore fluids, the formulations of the fluids of the present disclosure vary with the particular requirements of the subterranean formation.

A characteristic of the wellbore fluid which is controlled by the organophilic clay of this disclosure is its viscosity. The viscosity of wellbore fluids is very difficult to control because of the adverse conditions under which wellbore fluids are used, as well as the excessively elevated temperatures to which they will be exposed. In this regard, during the drilling of certain deep wells, i.e., greater than 15,000 feet, it is common to be exposed to temperatures at which thermal decomposition of certain wellbore fluid additives occurs. These temperatures can easily cause a severe change in the viscosity of the fluid and thus adversely affect the flow characteristics of the mud and adversely affect the overall drilling operation. Such viscosity modification at these temperatures is not acceptable in typical wellbore fluids. Additionally, certain geographic regions have excessive geothermal activity resulting in extremely high temperatures. The effect on wellbore fluids at these geothermally elevated temperatures may be similar to the effect of elevated temperatures in deep wells.

The fluids may be formulated or mixed according to various procedures, as generally known for producing wellbore fluids. In some embodiments, the organophilic clay may be pre-dispersed, such as in oil or water and allowed to swell or yield, prior to addition to other components. Shearing of the composition, such as for at least 25 minutes, may occur after dispersion of the clay. At least one emulsifier and aqueous fluid, such as brine (e.g., halide brine, zinc brine), may be added to the dispersed clay, followed by additional shearing. The process of formulating the wellbore fluid may continue with the addition of portions of aqueous fluid (e.g., brine), followed by shearing. In particular embodiments, the organophilic clay may first be dispersed into an oleaginous fluid, followed by addition of an emulsifier and aqueous fluid.

Upon mixing, the fluids, such as FLCPs, of the present embodiments may be used in wellbore related operations, such as drilling, completion, workover, production operations, or the like. Wellbore techniques are known to persons skilled in the art and involve pumping a wellbore fluid into a wellbore through an earthen formation. The fluids of the present embodiments may have particular application for use in high temperature environments. The fluid formulations disclosed herein may possess relatively high thermal stability, having particular application for use in environments of approximately 375° F. It is also envisioned that the fluid may be circulated into a well (either pumped through a drill string during drilling or subsequent to drilling such as by spotting a pill of the fluid into the well) and allowed to remain static or substantially static for at least 2 days. Thus, during such static periods, one or more completion operations may be performed, including, but not limited to placement of a screen, gravel packing, fracking, frac-packing, etc. It more particular embodiments, the fluid may remain static in a well for at least 3, 4, 5, 6, 7, or 14 days during (and/or after) one or more completion operations prior to the well being put into production. During such time, the invert emulsion fluid of the present disclosure may advantageously retain its rheological properties (or at least stay within acceptable rheological properties) over the duration of the time for completion operations to occur (or for the well to be put into production) and without substantial phase separation.

In any event, the viscosity of the wellbore fluid may be controlled within desired ranges, which are in many instances dependent on the geographic area of activity. The viscosity is a function of plastic viscosity and yield point. As a general rule, as the mud weight increases, the plastic viscosity increases, but the yield point increases by a much smaller magnitude.

Another characteristic is the gel strength of the wellbore fluid. Gel strength is a characteristic of the wellbore fluid which reflects the ability of the fluid to maintain a suspension of additives and drill cuttings, especially when circulation is stopped. As can be appreciated, if circulation of the fluid were terminated, and if all of the suspended cuttings and additives to the fluid were then permitted to settle to the lowest point, the drill bit and drill string would be literally packed into a position that would result in severe levels of torque to rotate. Such torque might damage components of the drill string or in some instances cause the drill string to shear apart. Such a situation results in loss of the drill bit and sustained periods where positive footage is not being drilled.

If the fluid gel strength is too low, it may be increased by increasing the amount of gelling agent incorporated in the fluid. Ideally, the fluid gel strength should be just high enough to suspend barite and drill cuttings, or other solid particles, when circulation is stopped. However, too high of a gel strength can retard the separation of cuttings and of entrained gas at the surface, and also because they raise the pressure to reestablish circulation after changing bits. Furthermore, when pulling pipe, a high gel strength may reduce the pressure of the mud column beneath the bit because of a swabbing action. If the reduction in pressure exceeds the differential pressure between the mud and the formation fluids, the fluids will enter the hole, and possibly cause a blowout. Similarly, when running pipe into the hole, the downward motion of the pipe causes a pressure surge which may cause fracturing with consequent loss of circulation. Methods have been developed for calculation of the magnitude of these pressure surges.

Related to the gel strength control is the ability of the fluid to tolerate divalent ions, including the compatibility of the various components (including polymeric fluid loss control agents and gelling agents) with divalent brines. For example, many products will not result in the same viscosity profile in divalent brines as compared to monovalent brines or fresh water. However, in HPHT wells, heavier divalent brines may be used to balance the pressures downhole. The fluid additives of this disclosure display a high tolerance to divalent cations, particularly zinc chloride and zinc bromide.

Another function of the fluid is its ability to seal permeable formations exposed by the bit with a low permeability filter cake, for example. Fluid loss from the borehole may therefore be reduced. In order for a filter cake to form, the fluid may contain particles of a size slightly smaller than that of the pore openings of the formation. These particles are trapped in the surface pores while finer particles are carried deeper into the formation. The particles which are deposited on the formation are known as the filter cake.

The present FLCP may be an invert emulsion having an oleaginous continuous phase, a non-oleaginous or aqueous discontinuous phase, and at least one organophilic clay as discussed above. The oleaginous fluid may be a liquid and more specifically is a natural or synthetic oil and more particularly the oleaginous fluid is selected from the group including diesel oil; mineral oil; a synthetic oil, such as hydrogenated and unhydrogenated olefins including poly (alpha-olefins), linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one embodiment, the amount of oleaginous fluid is from about 20% to about 95% by volume and more particularly about 30% to about 90% by volume of the invert emulsion fluid. The oleaginous fluid, in one embodiment, may include at least 5% by volume of a material selected from the group including esters, ethers, acetals, dialkylcarbonates, hydrocarbons, and combinations thereof.

The aqueous medium, such as an aqueous internal phase of a wellbore fluid, of the present disclosure may be water or brine. In those embodiments of the disclosure where the aqueous medium is a brine, the brine is water comprising an inorganic salt or organic salt. The salt may serve to provide desired density (to balance against the formation pressures), and may also reduce the effect of the base fluid on hydratable clays and shales encountered during drilling. In various embodiments of the wellbore fluid herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts.

In one embodiment, the brine may be a divalent halide selected from the group of alkaline earth halides. The brine may also comprise an organic salt, such as sodium, potassium, or cesium formate. Inorganic divalent salts include calcium halides, such as calcium chloride or calcium bromide. Sodium bromide, potassium bromide, or cesium bromide may also be used. The salt may be chosen for compatibility reasons, i.e., where the reservoir wellbore fluid used a particular brine phase and the completion/clean up fluid brine phase is chosen to have the same brine phase. In other embodiments, the divalent halide may be selected from transition metal ions including zinc, such as zinc bromide and/or zinc calcium bromide.

The oil/water ratio in invert emulsion fluids conventionally used in the field is in the range of 65/45 to 85/15. Several factors have conventionally dictated such ranges, including: the concentration of solids in the mud to provide the desired mud weight (solids laden muds must have a high O/W ratio to keep the solids oil wet and dispersed) and the high viscosities often experienced upon increase of the internal aqueous phase (due to the greater concentration of the dispersed internal phase). However, in addition to such conventional ranges, embodiments of the present disclosure may also relate to invert emulsion fluids having a high internal phase concentration (<50/50 O/W or less than 1:1 O/W). Thus in one embodiment the amount of non-oleaginous fluid is more than about 50% by volume, such as from about 50% to about 80% by volume. In another embodiment, the non-oleaginous fluid is from about 60% to about 80% by volume of the invert emulsion fluid. However, given that the fluids may also include conventional invert emulsion ratios, in one embodiment, the amount of non-oleaginous fluid ranges from about 1% to about 80% by volume. In another embodiment, the non-oleaginous fluid is preferably from about 5% to about 70% by volume of the invert emulsion fluid. While high internal phase fluids are inherently less stable, the present fluids, containing a unique combination of clays (discussed above) may unexpectedly have greater stability than a fluid formulated with each clay type alone (without the other) and may allow for thermal stability of the emulsion over a period of days (which is necessary when during the later stages of a well such as during completion operations, etc. when a fluid may remain in the well without substantial shear over at least 3, 4, or 5 days. Thus, one of more embodiments may involve the use of the present fluids which may possess rheological properties that do not substantially change (that is they stay within the acceptable margins) over the extent of the wellbore operation.

One embodiment of the present disclosure involves a method of drilling a wellbore. In one such illustrative embodiment, the method involves pumping a wellbore fluid into a wellbore during the wellbore through a reservoir section of the wellbore, and then allowing filtration of the wellbore fluid into the earthen formation to form a filter cake on the wellbore walls. The filter cake is partially removed afterwards, thus allowing initiation of the production of hydrocarbons from reservoir. The formation of such a filter cake is desired for drilling, particularly in unconsolidated formations with wellbore stability problems and high permeabilities. Further, in particular embodiments, the fluids of the present disclosure may be used to drill the reservoir section of the well, and the open hole well may be subsequently completed (such as with placement of a screen, gravel packing, etc.) with the filter cake remaining in place. After the completion equipment is installed, removal of the filter cake may be achieved through use of a breaker fluid (or internal breaking agent). It is also envisioned that the present fluids may be placed in the wellbore (including in the reservoir section of an open hole) as a pill (solids free pill) to combat against fluid loss. The fluid may also be used during screen and/or liner running or in any other application where a non-Newtonian fluid is used.

As mentioned above, in the drilling of a well, the drilling fluid is typically circulated through the drill string, through the drill bit at the end of the drill string and up through the annulus between the drilled wellbore and drill string. The circulated drilling fluid is used to carry formation rock present as cuttings or drilled solids that are removed from the wellbore as the drilling fluid is circulated back to the surface.

In the construction of the well, a casing may be positioned within a portion of the drilled wellbore and cemented into place. The portion of the wellbore that is not lined with the casing forms the uncased or open hole section where, in accordance with some embodiments of the present disclosure, a sand control screen assembly is placed to facilitate gravel packing for controlling the migration and production of formation sand and to stabilize the formation of the open hole section. Once the wellbore is drilled and the casing cemented into place, the well may be completed by installing sand screens and gravel packing the open hole section so that produced fluids from the formation are allowed to flow through the gravel pack and sand screen and may be recovered through the wellbore. The open hole section may be any orientation, including vertical and horizontal hole sections.

After the open hole and cased hole sections are displaced with the respective displacement fluids, the drilling string may be removed from the wellbore and the desired sand control screen assembly may be run or lowered to a selected depth within the open hole section of the well bore. The sand screen assembly may be run or lowered into the wellbore on a tubular member or wash pipe, which is used for conducting fluids between the sand screen and the surface. Running the sand screen assembly to the selected depth may include positioning the sand screen in vertical or non-vertical (horizontal) sections of the well. A packer may be positioned and set in the casing above the sand screen to isolate the interval being packed. A crossover service tool may also be provided with the assembly to selectively allow fluids to flow between the annulus formed by the open hole and the screen assembly and the interior of the tubular member and wash pipe.

With the sand control screen assembly in place, a gravel pack slurry containing gravel for forming the gravel pack and a carrier fluid is introduced into the wellbore to facilitate gravel packing of the open hole section of wellbore in the annulus surrounding the sand control screen. The gravel pack slurry is typically introduced into the tubular member where it flows to the cross over tool into the annulus of the open hole section below the packer and the exterior of the sand control screen. As the gravel settles within the open hole section surrounding the screen, the carrier fluid passes through the screen and into the interior of the tubular member. The carrier fluid is conducted to the crossover tool and into the annulus between the casing and the tubular member above the packer.

The invert emulsion fluids may be used with almost any type of liner or and/or sand control screen assembly. These may include pre-holed liners, slotted, liners, wire-wrapped screens, prepacked screens, direct-wrapped sand screens, mesh screens, premium-type screens, etc. Premium-type screens typically consist of multilayers of mesh woven media along with a drainage layer. Premium-type screens do not have a well defined screen opening size. In contrast, wire wrap screens consist of wire uniformly wrapped around a perforated base pipe. The wire wrap screens have a relatively uniform screen opening defined as gauge opening. Further, as described above, the sand control screen assembly may also include those with alternate flow paths or shunt tubes. Moreover, screen assemblies may also include those that include diverter valves for diverting fluid returns through a shorter pathway, preventing pressure build up during the gravel packing process. Other completion equipment with which the invert emulsions may be used includes packer assemblies (including swell packer assemblies), which separate upper annuli from lower production equipment in a well, or inflow control devices, which limit the inflow of fluids into the production tubing) The particular type of equipment is of no limitation on the present disclosure; rather, the invert emulsions may be used with any type of equipment while the equipment is being run in the hole or during subsequent completion operations prior to the well being put into production. Further, depending on the arrangement, one or more of such completion equipment may be used in combination with each other.

In accordance with embodiments of the present disclosure, prior to installing sand control screens (using the present fluids or not) and/or gravel packing (using the present fluids or not), the drilling fluid may optionally be first displaced from the open hole section to a displacement fluid, and a second fluid may optionally be used to displace the fluid in a cased hole section. Displacement of the drilling fluids from the open hole section may be carried out by introducing the displacement fluid into the wellbore by passing the displacement fluid through the tubular drill string to the open hole section. As the displacement fluid is pumped through the drill string, the drilling fluids in the open hole section are carried upward through the annulus formed by the casing and the drill string. In a particular embodiment, if the formation includes reactive clays, the displacement fluid for the open hole section may include the present invert emulsions to help maintain the integrity of the open hole section containing reactive shales or clays that could otherwise be damaged if water-based fluids were used to displace the drilling fluids. In certain embodiments, the volume of first displacement fluid used may be sufficient to displace the open hole section plus the cased hole section up to the packer setting depth.

When a sufficient volume of the first displacement fluid is introduced into the wellbore to displace the drilling fluid from the open hole section of the wellbore, a second displacement fluid (optionally the same or different than the first) is used to displace at least a portion or all of the cased hole section of the wellbore. In certain embodiments, the volume of the second fluid may be sufficient to displace the entire cased section above the packer setting depth. This may be carried out by raising the end of the tubular drill string so that it is positioned within the cased hole section above the open hole section so that the second displacement fluid is discharged from the end of the drill string into the cased hole section.

Sand control screens and/or liners, or other completion equipment such as packer assemblies (including swell packer assemblies) or inflow control devices (limiting the inflow of fluids into the production tubing) are then run to target depth, which may optionally be in the presence of the invert emulsions of the present disclosure. The sand control screen may be a standalone sand screen or an expandable sand screen. After the sand control screen is installed, the well may be gravel packed with a invert emulsion fluid, as disclosed herein. Further, one of ordinary skill in the art would appreciate that one or more of such completion equipment may be used in combination.

According to various embodiments, the fluid formulations of the present disclosure may be easily transportable and maintain their properties during transportation. The effectiveness of a wellbore fluid and in particular the additives found in the wellbore fluid is evaluated by measurement of certain characteristics of the wellbore system. The viscosity, gel strength, filtrate loss, contamination control and tolerance to divalent ion characteristics of wellbore fluids and wellbore systems are all directly attributable to the components of the fluid or mud.

Breaker Fluids

In embodiments described herein, by filtration of a wellbore fluid into the earthen formation, a filter cake may be formed on the wellbore walls. After completion of the drilling or completion process, the filter cake may be broken by application of a breaker fluid. The breaker fluid may be circulated in the wellbore during or after the performance of the at least one completion operation. In other embodiments, the breaker fluid may be circulated either before, during, or after a completion operation has commenced to destroy the integrity of and clean up residual wellbore fluids remaining inside casing or liners. The breaker fluid contributes to the degradation and removal of the filter cake deposited on the sidewalls of the wellbore to minimize negatively impacting production. Upon cleanup of the well, the well may then be converted to production.

In one or more embodiments, before, during, or after a completion operation has started or upon conclusion of all completion operations, the circulation of an acid wash such as hydrochloric acid, sulfuric acid, citric acid, formic acid, acetic acid, other organic acids, or mixtures thereof may be used to at least partially dissolve some of the filter cake remaining on the wellbore walls. Other embodiments may use breaker fluids that contain hydrolysable esters of organic acids and/or various oxidizers in combination with or in lieu of an acid wash.

Examples of suitable organic acids that may be used as the breaking agent may include salicylic acid, glycolic acid, malic acid, maleic acid, fumaric acid, and homo- or copolymers of lactic acid and glycolic acid as well as compounds containing hydroxy, phenoxy, carboxylic, hydroxycarboxylic or phenoxycarboxylic moieties. In addition to organic acids, hydrolysable esters which may hydrolyze to release an organic (or inorganic) acid may also be used, including, for example, hydrolyzable esters of a $C_1$ to $C_6$ carboxylic acid and/or a $C_2$ to $C_{30}$ mono- or poly-alcohol, including alkyl orthoesters. In addition to these hydrolysable carboxylic esters, hydrolysable phosphonic or sulfonic esters could be utilized, such as, for example, $R^1H_2PO_3$, $R^1R^2HPO_3$, $R^1R^2R^3PO_3$, $R^1HSO_3$, $R^1R^2SO_3$, $R^1H_2PO_4$, $R^1R^2HPO_4$, $R^1R^2R^3PO_4$, $R^1HSO_4$, or $R^1R^2SO_4$, where $R^1$, $R^2$, and $R^3$ are $C_2$ to $C_{30}$ alkyl-, aryl-, arylalkyl-, or alkylaryl-groups. One example of a suitable hydrolysable ester of carboxylic acid is available from M-I, L.L.C. (Houston, Tex.) under the name D-STRUCTOR.

In some instances, it may also be desirable to include an oxidant in the breaker fluid, to further aid in breaking or degradation of polymeric additives present in a filter cake. Examples of such oxidants may include any one of those oxidative breakers known in the art to react with polymers such as polysaccharides to reduce the viscosity of polysaccharide-thickened compositions or disrupt filter cakes. Such compounds may include peroxides (including peroxide adducts), other compounds including a peroxy bond such as persulphates, perborates, percarbonates, perphosphates, and persilicates, and other oxidizers such as hypochlorites, which may optionally be encapsulated as taught by U.S. Pat. No. 6,861,394, which is assigned to the present assignee. Further, use of an oxidant in a breaker fluid, in addition to affecting polymeric additives, may also cause fragmentation of swollen clays, such as those that cause bit balling.

It should be appreciated that the amount of delay between the time when a breaker fluid according to the present disclosure is introduced to a well and the time when the fluids have had the desired effect of breaking/degrading/dispersing the filter cake may depend on several variables. One of skill in the art should appreciate that factors such as the downhole temperature, concentration of the components in the breaker fluid, pH, amount of available water, filter cake composition, etc. may all have an impact. For example downhole temperatures can vary considerably from 100° F. to over 400° F. depending upon the formation geology and downhole environment. However, one of skill in the art via trial and error testing in the lab should easily be able to determine and thus correlate downhole temperature and the time of efficacy of for a given formulation of the breaker fluids disclosed herein. With such information one can predetermine the time period to shut-in a well given a specific downhole temperature and a specific formulation of the breaker fluid.

However, it should also be appreciated that the breaker fluid formulation itself and thus the fluid's chemical properties may be varied so as to allow for a desirable and controllable amount of delay prior to the breaking of invert emulsion filter cake for a particular application. In one embodiment, the amount of delay for an invert emulsion filter cake to be broken with a water-based displacement fluid according to the present disclosure may be greater than 1 hour. In various other embodiments, the amount of delay for an invert emulsion filter cake to be broken with a water-based displacement fluid according to the present disclosure may be greater than 3 hours, 5 hours, or 10 hours. Thus the formulation of the fluid can be varied to achieve a predetermined break time and downhole temperature.

The superior thermal stability and performance of the formulations of this disclosure in controlling the filtrate loss from the wellbore fluid were determined by conducting the following tests.

Rheology Test

Viscosity is a measurement describing the flow properties of wellbore fluids and their behavior while under influence of shear stress. Using a Fann 35 Viscometer, Fann 70 Viscometer, Grace Viscometer, the rheological parameters, such as plastic viscosity (PV) and yield point (YP) may be determined. One of skill in the art will appreciate that the viscosity measurements will be dependent upon the temperature of the gel composition, the type of spindle, and the number of revolutions per minute. Generally, increase in the plastic viscosity and yield point values are proportional to increase of the wellbore fluid density, but the yield point increases by a smaller magnitude.

Plastic Viscosity Test

Plastic viscosity (PV) is one variable used in the calculation of viscosity characteristics of a wellbore fluid, measured in centipoise (cP) units. PV is the slope of the shear stress-shear rate plot above the yield point and is derived from the 600 rpm reading minus the 300 rpm reading. A low PV indicates that the fluid is capable of drilling rapidly because of the low viscosity of fluid exiting at the bit. High PV may be caused by a viscous base fluid and by excess colloidal solids. To lower PV, a reduction in solids content can be achieved by dilution.

Yield Point Test

Yield point (YP) is another variable used in the calculation of viscosity characteristics of fluids, measured in pounds per 100 feet square (lb/100 ft$^2$). The physical meaning of the Yield Point (YP) is the resistance to initial flow. YP is used to evaluate the ability of a fluid to lift cuttings out of the annulus. The Bingham plastic fluid plots a straight line on a shear-rate (x-axis) versus shear stress (y-axis) plot, in which YP is the zero-shear-rate intercept (PV is the slope of the line). YP may be calculated from 300-rpm and 600-rpm viscometer dial readings by subtracting PV from the 300-rpm dial reading and it is reported as lbf/100 ft$^2$. A higher YP implies that fluid has ability to carry cuttings better than a fluid of similar density but lower YP.

pH Test

The pH test is performed using pH paper to determine the acidity of the wellbore fluid.

High Temperature High Pressure Fluid Loss Test

"HTHP" is the term used for high temperature high pressure fluid loss, measured in milliliters (mL) according to API bulletin RP 13 B-2, 1990. This test is conducted for testing fluid loss behavior of mud. Mud is pressed through filter paper located in the HTHP filter press at 300° F. with differential pressure at 500 psi for 30 minutes. Thickness of filter cake stuck in filter paper should be less than 2 ml.

Gel Strength Test

The gel strength (thixotropy) is the shear stress measured at low shear rate after a mud has set quiescently for a period of time (10 seconds and 10 minutes in the standard API procedure, although measurements after 30 minutes or 16 hours may also be made).

The preparation and the superior properties of the wellbore fluids of the present disclosure in a thermally elevated and contaminated environment are further described in the following examples.

The following examples are presented to illustrate the preparation and properties of the fluids and should not be construed to limit the scope of the disclosure, unless otherwise expressly indicated in the appended claims. All percentages, concentrations, ratios, parts, etc. are by weight unless otherwise noted or apparent from the context of their use.

The wellbore fluids of this disclosure, which include the fluid loss control agent and the gelling material comprising a clay and a cross-linked polymer, effectively control the viscosity, gel strength and fluid loss of an aqueous wellbore fluid when exposed to high temperatures.

EXAMPLES

The following examples are provided to further illustrate the application and the use of the methods and compositions of the present disclosure. The present examples tested different wellbore fluid formulations to assess their potential to be stable at high temperatures while providing increased viscosity and gel strength.

Example 1

A sample formulation of fluids as discussed herein may be formulated as a control and formulation 1 with a hectorite clay and a combination of high internal phase emulsifiers. Test data is shown below for such formulations after 7 days of static aging. After 7 days, phase separation was seen to occur in the control and formulation #1. Emulsifier #1 is a reaction product of tall oil with a polyamine, and Emulsifier #2 is a polyolefin amide alkeneamine.

TABLE 1

Wellbore Fluid formulation in zinc bromide/calcium bromide system and its rheological properties

| Formulation | SG | Formulation #1 PPb | bbl/bbl |
|---|---|---|---|
| Synthetic IO 16-18 (0.78 SG) | 0.78 | 80.3 | 0.294 |
| Hectorite clay | 1.70 | 2 | |
| Emulsifier #1 | | 8 | |
| Emulsifier #2 | | 2 | |
| Internal brine | 2.08 | 500.42 | 0.686 |
| 19.2 ppg CaBr2/ZnBr2 | 2.30 | 459 | |
| Water | 1.00 | 40 | |
| Mud weight (target 14.00 ppg) | | 14.0 | |
| OWR (%) | | 40.3/59.7 | |
| Base brine density | | 17.36 | |

| Rheology - Static aging (SA) | |
|---|---|
| Static aging time (hrs) | Initials |
| 600 rpm | 195 |
| 300 rpm | 122 |
| 200 rpm | 92 |
| 100 rpm | 56 |
| 6 rpm | 7 |
| 3 rpm | 4 |
| Gel10 Sec (lbs/100 ft2) | 5 |
| Gel10 min Gel10 Sec (lbs/100 ft2) | 6 |
| PV (cP) | 73 |
| YP (lbs/100 ft2) | 49 |

To fully assess the properties of the formulation, the rheology of the resulting wellbore fluid was measured using a Fann 35 Viscometer at the rpm's listed above. At 375° F., each of the wellborefluids was hot rolled (HR) at the time intervals shown or static aged (SA). In addition, gel strength (shown as "gels") was measured at certain second or minute intervals, the rheology of which was measured with a Fann 35 Viscometer set at 3 rpm.

Example 2

A sample formulation of fluids as discussed herein may be formulated as in the above with the addition of magnesium silicate clay, such as Garamite®, and a hectorite clay, such as VERSAGEL HT. Test data is shown below for such formulations after 7 days of static aging.

TABLE 2

Wellbore Fluid formulation with hectorite clay and magnesium silicate clay in zinc bromide/calcium bromide system and its rheological properties

| Formulation | Formulation #2 ppb | bbl/bbl |
|---|---|---|
| Synthetic IO 16-18 (0.78 SG) | 80.3 | 0.294 |
| hectorite clay | 1.5 | |
| Emulsifier #1 | 8 | |
| Emulsifier #2 | 2 | |
| magnesium silicate clay | 1.5 | |
| Internal brine | 500.42 | 0.686 |
| 19.2 ppg CaBr2/ZnBr2 | 459 | |
| Water | 40 | |
| Mud weight (target 14.00 ppg) | 14.0 | |
| OWR (%) | 40.3/59.7 | |
| Base brine density | 17.36 | |

| Rheology - Static aging (10 days at 375° F.) | | |
|---|---|---|
| Static aging time (days) | Initial | 10 |
| Rheology Temp | 120 F. | 120 F. |
| 600 rpm | 102 | 230 |
| 300 rpm | 63 | 159 |
| 200 rpm | 49 | 129 |
| 100 rpm | 34 | 90 |
| 6 rpm | 12 | 27 |
| 3 rpm | 10 | 22 |
| Gel10 Sec (lbs/100 ft2) | 11 | 18 |
| Gel10 min Gel10 Sec (lbs/100 ft2) | 14 | 20 |
| PV (cP) | 39 | 71 |
| YP (lbs/100 ft2) | 24 | 88 |
| ES | 42 | 15 |

After aging for at least 5 days, formulations #2 exhibited thermal stability in high temperature high pressure (HTHP) conditions, maintained viscosity, and reduced wellbore fluid loss. In addition, formulations #2 exhibited improved low end rheology as compared to the control and formulations #1 shown in Table 1.

Example 3

Additional fluids were formulated as in the above with the presence of magnesium silicate clay, such as Garamite®, but with no hectorite clay as in formulations #2 in Table 2. Test data is shown below for formulations #3 after 7 days of static aging. However, the fluids of formulations #3 did not exhibit stability past 5 days.

TABLE 3

Wellbore Fluid formulation with magnesium silicate clay in zinc bromide/calcium bromide system and its rheological properties

| Formulation | Formulation #3 ppb | bbl/bbl |
|---|---|---|
| Synthetic IO 16-18 (0.78 SG) | 80.3 | 0.294 |
| Hectorite clay | 0 | |
| Emulsifier #1 | 8 | |
| Emulsifier #2 | 2 | |
| magnesium silicate clay | 3 | |
| Internal brine | 500.42 | 0.686 |
| 19.2 ppg CaBr2/ZnBr2 | 459 | |
| Water | 40 | |
| Mud weight (target 14.00 ppg) | 14.0 | |
| OWR (%) | 40.3/59.7 | |
| Base brine density | 17.36 | |
| Rheology - Static aging target 375° F. | | |

TABLE 3-continued

Wellbore Fluid formulation with magnesium silicate clay in zinc bromide/calcium bromide system and its rheological properties

| Formulation | Formulation #3 | |
|---|---|---|
| | ppb | bbl/bbl |
| Static aging time (days) | Initial | 5 |
| Rheology Temp | 120 F. | 120 F. |
| 600 rpm | 78 | Phase |
| 300 rpm | 48 | Separation |
| 200 rpm | 36 | |
| 100 rpm | 23 | |
| 6 rpm | 6 | |
| 3 rpm | 5 | |
| Gel10 Sec (lbs/100 ft2) | 6 | |
| Gel10 min Gel10 Sec (lbs/100 ft2) | 7 | |
| PV (cP) | 30 | 0 |
| YP (lbs/100 ft2) | 18 | 0 |
| ES | 15 | |

Embodiments of the present disclosure provide water-based wellbore fluids and methods of wellbore with such fluids for higher temperatures such as at least 275° F. The wellbore fluids of the present disclosure may be stable (over 7 days) in HTHP conditions, maintain viscosity, and prevent wellbore fluid loss at temperatures of at least 275° F., whereas use of conventional fluid loss control additives may begin to experience degradation at lower temperatures. Fluids discussed herein may not cause appreciable levels of formation damage.

Compositions here may relate to solids-free FLCP used with gravel pack screens (i.e., screen running fluids) during open hold gravel pack operations. Since the screens may be easily plugged with solids from wellbore fluids, solids-free fluids may be used to install such screens to prevent the occurrence of screen plugging.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed:

1. A composition comprising:
    an oleaginous continuous phase;
    an aqueous discontinuous phase;
    a first clay comprising an organophilic smectite clay; an emulsifier comprising a polyolefin amide alkeneamine; and
    a second clay comprising a magnesium silicate clay.

2. The composition of claim 1, wherein the organophilic smectite clay comprises a hectorite clay coated with a fatty acid.

3. The composition of claim 1, wherein the magnesium silicate clay is a sepiolite and/or palygorskite clay coated with a fatty acid.

4. The composition of claim 1, wherein the magnesium silicate clay is a pre-dispersed clay.

5. The composition of claim 1, wherein a ratio of the oleaginous phase to the aqueous discontinuous phase is less than 1:1.

6. The composition of claim 1, wherein the composition is a solids-free wellbore fluid.

7. The composition of claim 1, wherein the composition is thermally stable in temperatures up to 375° F.

8. The composition of claim 1, wherein the composition is thermally stable for at least 5 days.

9. The composition of claim 1, wherein the discontinuous phase comprises a halide brine.

10. The composition of claim 9, wherein the halide brine comprises a zinc halide.

* * * * *